(12) United States Patent
Vaghasiya et al.

(10) Patent No.: US 12,493,426 B2
(45) Date of Patent: *Dec. 9, 2025

(54) MODIFYING ACCESS OPERATIONS BASED ON TEMPERATURE PROJECTIONS

(71) Applicant: Micron Technology, Inc., Boise, ID (US)

(72) Inventors: Rakeshkumar Dayabhai Vaghasiya, Hyderabad (IN); Jameer Mulani, Bangalore (IN); Anil Sindhi, Hyderabad (IN); Dhruv Chauhan, Hyderabad (IN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/773,967

(22) Filed: Jul. 16, 2024

(65) Prior Publication Data

US 2025/0013379 A1 Jan. 9, 2025

Related U.S. Application Data

(63) Continuation of application No. 17/677,544, filed on Feb. 22, 2022, now Pat. No. 12,067,281.

(Continued)

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0604; G06F 3/0679
See application file for complete search history.

(56) References Cited

U.S. PATENT DOCUMENTS 10,156,987 B1 12/2018 Gutierrez et al.
2016/0147463 A1 5/2016 Han et al.
(Continued)

OTHER PUBLICATIONS

Charles, Subodha, Hadi Hajimiri, and Prabhat Mishra. "Proactive thermal management using memory-based computing in multicore architectures." 2018 Ninth International Green and Sustainable Computing Conference (IGSC). IEEE, 2018. (Year: 2018).*

(Continued)

*Primary Examiner* — Nicholas J Simonetti
(74) *Attorney, Agent, or Firm* — Holland & Hart LLP

(57) ABSTRACT

Techniques for memory operations are described. Indications of temperature levels at a memory device may be received, where each of the indications may be associated with a respective time point. Based on an indicated temperature level satisfying a first threshold, a derivative of a temperature of the memory device may be calculated using the indicated temperature levels. Based on calculating the derivative, a determination as to whether the derivative satisfies a second threshold may be determined. If the derivative satisfies the second threshold, operations for accessing the memory device may be modified. A second derivative of the temperature of the memory device may similarly be calculated and compared against a third threshold based on the indicated temperature level satisfying the first threshold. If the second derivative satisfies the third threshold, operations for accessing the memory device may be modified by a different amount.

20 Claims, 7 Drawing Sheets

Related U.S. Application Data

(60) Provisional application No. 63/295,030, filed on Dec. 30, 2021.

(56) References Cited

U.S. PATENT DOCUMENTS

| | | |
|---|---|---|
| 2017/0038805 A1* | 2/2017 | Chun .................... G06F 3/0604 |
| 2017/0171019 A1 | 6/2017 | Nayak et al. |
| 2021/0294530 A1 | 9/2021 | Boehm et al. |
| 2022/0113881 A1 | 4/2022 | Roberts |
| 2023/0205435 A1 | 6/2023 | Murphy et al. |

OTHER PUBLICATIONS

Chan, Christine S., et al. "Optimal performance-aware cooling on enterprise servers." IEEE Transactions on Computer-Aided Design of Integrated Circuits and Systems 38.9 (2018): 1689-1702. (Year: 2018).

* cited by examiner

MODIFYING ACCESS OPERATIONS BASED ON TEMPERATURE PROJECTIONS

CROSS REFERENCE

The present Application for Patent continuation of U.S. patent application Ser. No. 17/677,544 by VAGHASIYA et al., entitled "MODIFYING ACCESS OPERATIONS BASED ON TEMPERATURE PROJECTIONS," filed Feb. 22, 2022, which claims priority to and the benefit of U.S. Provisional Patent Application No. 63/295,030 by VAGHASIYA et al., entitled "MODIFYING ACCESS OPERATIONS BASED ON TEMPERATURE PROJECTIONS," filed Dec. 30, 2021, each of which is assigned to the assignee hereof, and each of which is expressly incorporated by reference herein.

FIELD OF TECHNOLOGY

The following relates generally to one or more systems for memory and more specifically to modifying access operations based on temperature projections.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
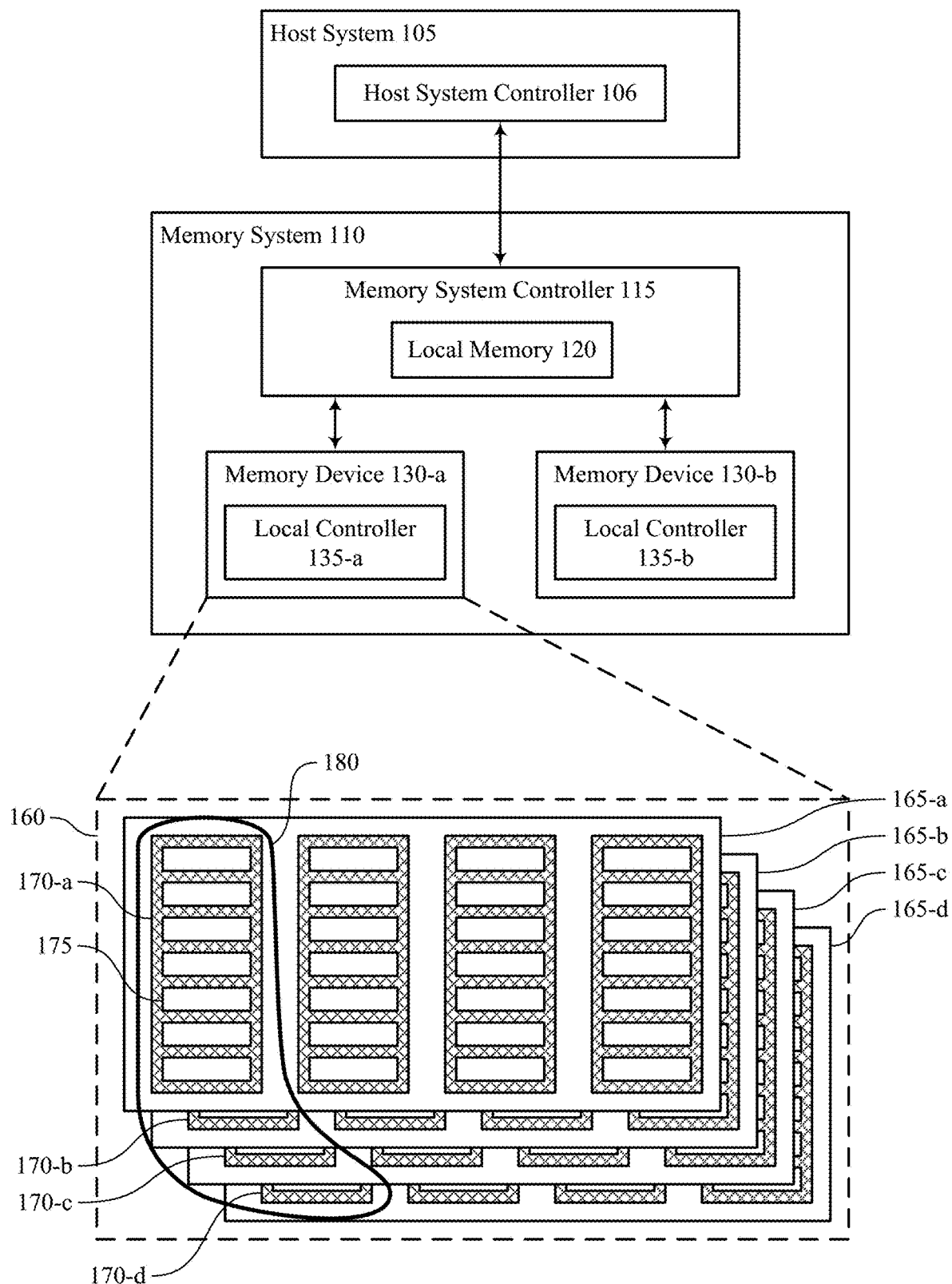
FIG. 1 illustrates an example of a system that supports modifying access operations based on temperature projections in accordance with examples as disclosed herein.

A performance of a memory system may be affected by high temperatures—e.g., the performance may decrease when a temperature of the memory system satisfies (e.g., exceeds, or meets or exceeds) a threshold. A temperature of a memory system may increase for a multitude of reasons, including an increase in ambient temperature, an increase in a frequency of operations for accessing the memory system, or both. A memory system may be configured to modify a frequency of write operations at a memory device when a temperature of the memory device satisfies a temperature threshold. Modifying a frequency of write operations may include reducing a frequency of write operations for the memory device (e.g., by buffering write commands received from a controller), which may increase a write latency for the controller. Operations for reducing a frequency of operations for accessing memory system may be referred to as "throttling operations."

However, throttling write operations when a temperature of the memory device satisfies a temperature threshold is often a reactive response to temperature increases and fails to consider the cause of the temperature increase. Accordingly, the effectiveness of throttling to combat high temperatures of the memory device may depend on a cause of the high temperatures of the memory device. For example, the throttling may be more effective against temperature increases caused by increases in ambient temperature than by temperature increases caused by increases in access operations.

To proactively address temperature increases of memory devices, enhanced techniques may be used to distinguish temperature increases caused by increased ambient temperature from temperatures increased caused by increased access operations. The distinguishing of these causes of increased temperature may be used to predict a temperature of the memory devices at a later point in time. Throttling operations may be performed based on the determined cause of the temperature increase of the memory devices, a predicted temperature of the memory devices, or both.

In some examples, indications of temperature levels at a memory device may be received, where each of the indications may be associated with a respective time point. Based on an indicated temperature level satisfying a first threshold, a derivative of a temperature of the memory device may be calculated using the indicated temperature levels. Based on calculating the derivative, a determination as to whether the derivative satisfies a second threshold may be determined. If the derivative satisfies the second threshold, operations for accessing the memory device may be modified—e.g., a frequency of the operations for accessing the memory device may be reduced (which may also be referred to as "throttling"). Operations for accessing the memory device may include write operations, read operations, garbage collection operations, and folding operations, among others. A second derivative of the temperature of the memory device may similarly be calculated and compared against a third threshold based on the indicated temperature level satisfying the first threshold. If the second derivative satisfies the third threshold, operations for accessing the memory device may be modified by a different amount—e.g., a larger amount than when only the derivative satisfies the second threshold.

Features of the disclosure are initially described in the context of systems, devices, and circuits. Features of the disclosure are also described in the context of a timing diagram and process flow. These and other features of the disclosure are further illustrated by and described in the context of an apparatus diagram and flowchart that relate to modifying access operations based on temperature projections.

FIG. 1 illustrates an example of a system 100 that supports modifying access operations based on temperature projections in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random-access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165 *c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support modifying access operations based on temperature projections. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

To proactively address temperature increases of memory devices, enhanced techniques may be used to distinguish temperature increases caused by increased ambient temperature from temperatures increased caused by increased access operations. The distinguishing of these causes of increased temperature may be used to predict a temperature of the memory devices at a later point in time. Throttling operations may be performed based on the determined cause of the temperature increase of the memory devices, a predicted temperature of the memory devices, or both.

In some examples, a controller (e.g., local controller 135-a, memory system controller 115, or host system controller 106) may receive indications of temperature levels at a memory device 130, where each of the indications may be associated with a respective time point. Based on an indicated temperature level satisfying a first threshold, the controller may calculate a derivative of a temperature of the memory device 130 using the indicated temperature levels. Based on calculating the derivative, the controller may determine whether the derivative satisfies a second threshold. If the derivative satisfies the second threshold, the controller may modify operations for accessing the memory device 130—e.g., a frequency of the operations for accessing the memory device 130 may be reduced (which may also be referred to as "throttling"). Operations for accessing the memory device 130 may include write operations, read operations, folding operations, wear-leveling operations, garbage collection operations, background refresh operations, scrub operations, block scan operations, and health monitoring operations, among others. The controller may similarly calculate a second derivative of the temperature of the memory device 130 and compare the second derivative against a third threshold based on the indicated temperature level satisfying the first threshold. If the second derivative satisfies the third threshold, the controller may modify operations for accessing the memory device 130 by a different amount—e.g., a larger amount than when the derivative satisfies the second threshold and the second derivative does not satisfy the third threshold.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

Figure 2:
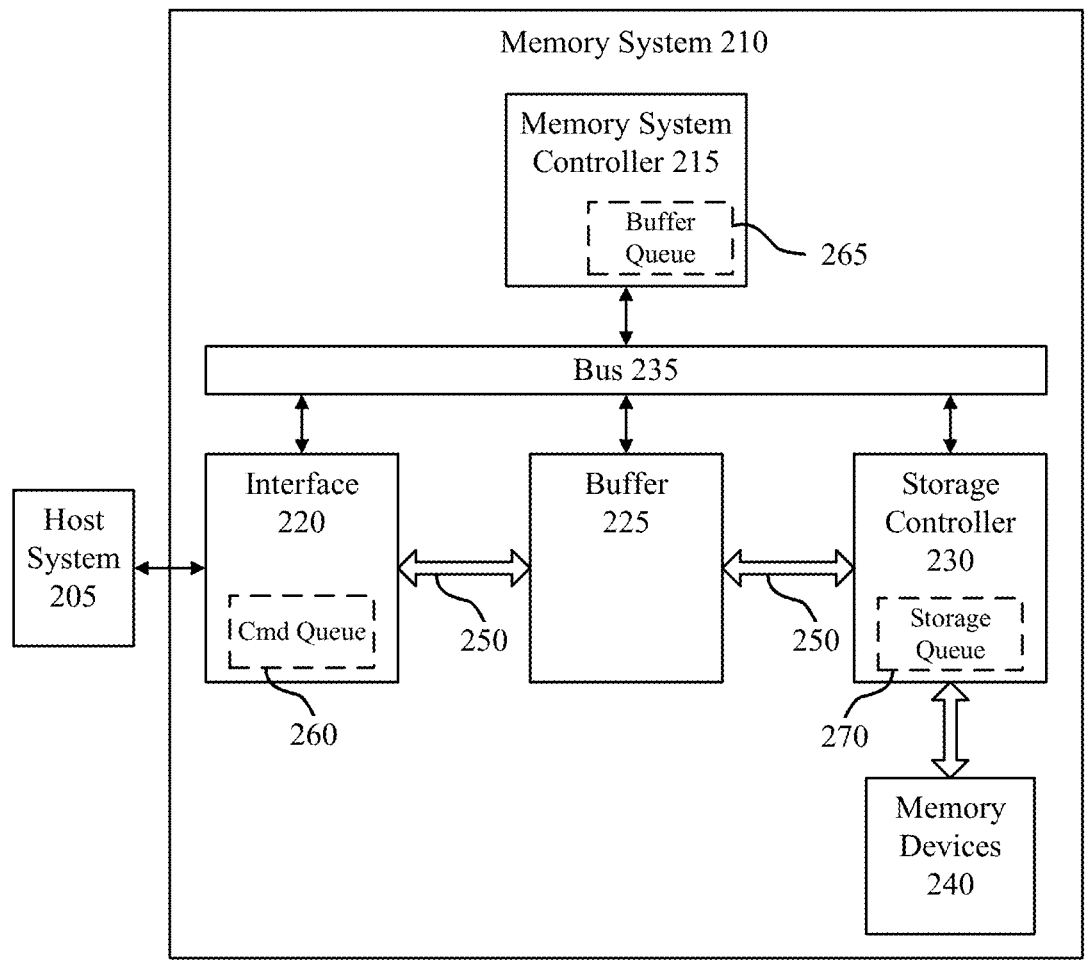
FIG. 2 illustrates an example of a system that supports modifying access operations based on temperature projections in accordance with examples as disclosed herein.

FIG. 2 illustrates an example of a system 200 that supports modifying access operations based on temperature projections in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

A performance of memory device 240 may be affected by high temperature. For example, the performance may decrease when a temperature of memory device 240 satisfies (e.g., exceeds, or meets or exceeds) a temperature threshold—e.g., a quantity of bit errors may increase. A temperature of the memory device 240 may increase as a result of an increase in a surrounding environment—e.g., an increase in the ambient temperature. For example, the temperature of the memory device 240 may increase if memory device 240 is in an enclosure with inadequate cooling or exposed to harsh environments. Increases in the temperature of the memory device 240 caused by ambient temperatures may be relatively linear or gradual.

Additionally, or alternatively, a temperature of the memory device 240 may increase as a result of increased activity for accessing the memory device 240. For example, a temperature of the memory device 240 may increase based on an increased frequency of write operations being performed. Similarly, a temperature of the memory device 240 may increase based on an increased frequency of read operations being performed. In some examples, the increase in the temperature of the memory device 240 may be based on the type of write or read operation being performed—e.g., multi-level write operations (for multi-level cells, such as tri-level or quad-level cells) may increase a temperature of the memory device 240 by a larger amount than single-level write operations.

Also, a temperature of the memory device 240 may increase based on an increased frequency of internal operations or background operations, such as increased frequency of garbage collection operations, an increased frequency of folding operations, or the like. Folding operations may involve writing, to multi-level cells using multi-level write operations, data that was stored in single-level or multi-level cells using single-level write operations—e.g., to more efficiently utilize the storage capability of the memory device 240. Increases in the temperature of the memory device 240 due to increased access activities may be relatively exponential or more rapid than for temperature increases due to increases in ambient temperature.

A memory system 210 (e.g., a memory system controller 215 or storage controller 230 at memory system 210) may be configured to modify a frequency of write operations at a memory device 240 when a temperature of the memory device 240 satisfies a temperature threshold. Modifying a frequency of write operations may include reducing a frequency of write operations for the memory device 240 (e.g., by buffering write commands received from a host system 205 or a controller within memory system 210), which may increase a write latency for host system 205. Operations for reducing a frequency of operations for accessing a memory device 240 or memory system 210 may be referred to as "throttling operations."

However, throttling write operations when a temperature of the memory device 240 satisfies a temperature threshold is often a reactive response to temperature increases and fails to consider the cause of the temperature increase. Accordingly, the effectiveness of throttling to combat high temperatures of the memory device 240 may depend on a cause of the high temperatures of the memory device 240. For example, the throttling may be more effective against temperature increases caused by increases in ambient temperature than for temperature increases caused by increases in access operations. In some examples, the level of throttling may be based on averaging a pre-deployment expected increase in temperature caused by increased ambient temperature and typical quantities of access operations, and thus, may be excessive for mitigating temperature increases caused by ambient temperature and lacking for mitigating temperature increases caused by higher quantities of access operations.

To proactively address temperature increases of memory devices, enhanced techniques may be used to distinguish temperature increases caused by increased ambient temperature from temperatures increased caused by increased access operations. The distinguishing of these causes of increased temperature may be used to predict a temperature of the memory devices at a later point in time. Throttling operations may be performed based on the determined cause of the temperature increase of the memory devices, a predicted temperature of the memory devices, or both.

In some examples, a controller (e.g., memory system controller 215 or storage controller 230) receives indications of a temperature of the memory devices 240—e.g., from one or more temperature sensors. The controller may monitor the temperature of the memory devices 240 based on the received indications. Once the temperature of the memory devices 240 satisfies a temperature threshold (which may be referred to as a "start measurement threshold"), the controller may begin computing one or more derivatives (e.g., a first-order derivative, a second-order derivative) of the temperature of the memory devices 240. In some examples, a first-order derivative of the temperature of the memory devices 240 is indicative of changes in an ambient temperature. And a second-order derivative of the temperature of the memory devices 240 is indicative of changes in a frequency of access operations performed at the memory devices 240.

The controller may monitor the one or more derivatives against one or more corresponding thresholds. Based on detecting that one or more of the derivatives of the temperature of the memory devices 240 satisfies a corresponding threshold, the controller may initiate a throttling operation. As part of the throttling operations, the controller may reduce a frequency of one or more of write operations, of multi-level write operations, read operations, multi-level read operations, folding operations, wear-leveling operations, garbage collection operations, background refresh operations, scrub operations, block scan operations, and health monitoring operations. In some examples, the reduction in the frequency may be based on the type of derivative that satisfies a corresponding threshold. For example, if a first-order derivative of the temperature of the memory devices 240 satisfies a corresponding threshold, the controller may decrease the frequency by a first amount—e.g., the controller may decrease the frequency of access operations by a first amount, or by an amount that is based on the first-order derivative of the temperature (e.g., proportionately to an amount by which the first-order derivative exceeds the corresponding threshold). Or if a second-order derivative of the temperature of the memory devices 240 satisfies a corresponding threshold, the controller may decrease the frequency by a second, larger amount or by an amount that is based on the second-order derivative of the temperature (e.g., proportionately to an amount by which the second-order derivative exceeds the corresponding threshold).

In some examples, the controller may initiate a throttling operation based on the measured temperature, even when none of the one or more derivatives satisfy a threshold—e.g., if the temperature of the memory device 240 continues to increase above a second threshold (e.g., which may be referred to as a "high temperature threshold").

By throttling access operations based on a cause of a temperature increase, a predicted temperature increase of a memory device may be determined and throttling operations may be proactively initiated to appropriately address an expected temperature increase of the memory devices. Accordingly, a performance (e.g., a reliability) of memory devices may be improved by preventing or reducing an exposure of the memory devices to high temperature conditions.

Figure 3:
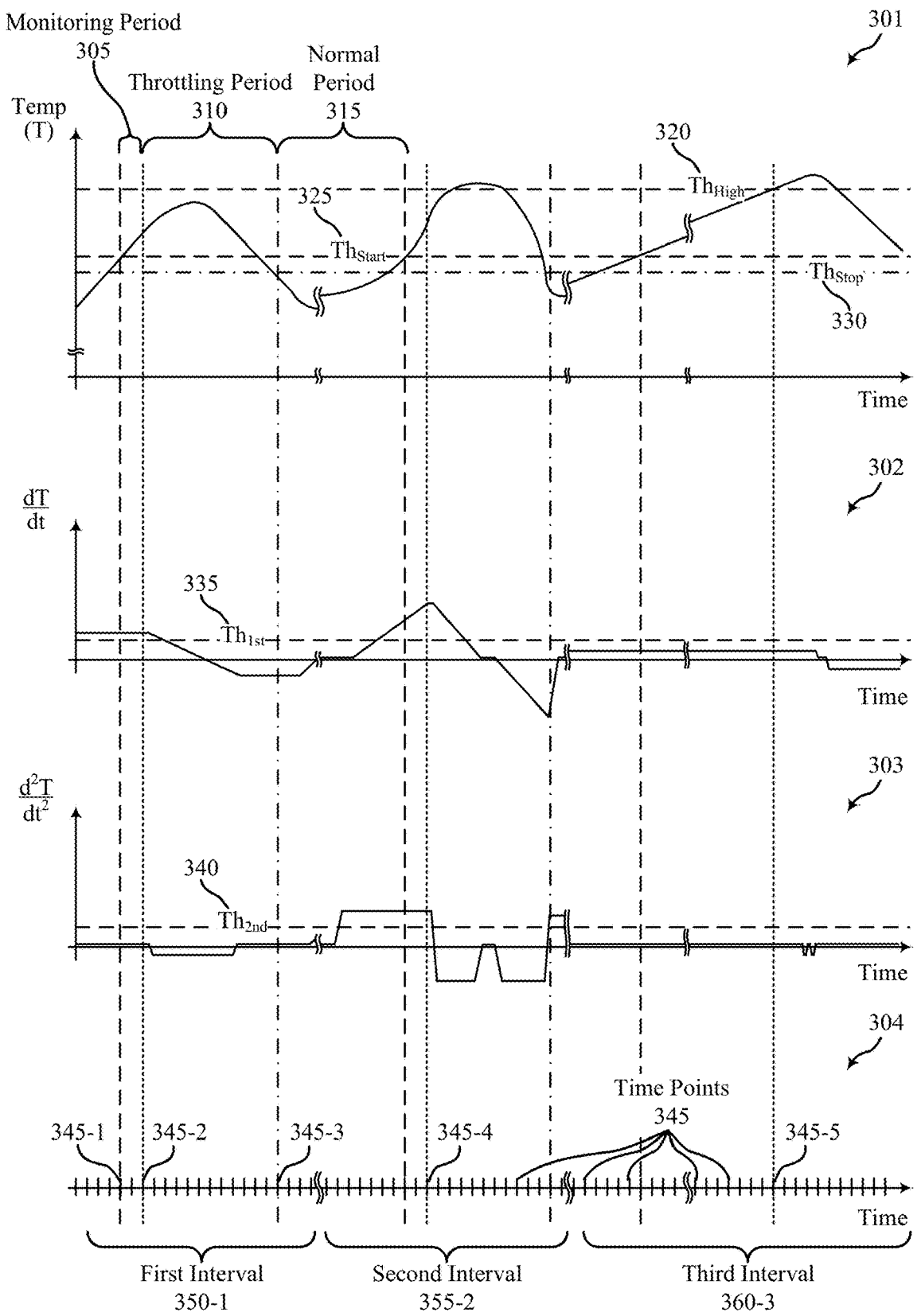
FIG. 3 illustrates an example of a timing diagram that supports modifying access operations based on temperature projections in accordance with examples as disclosed herein.

FIG. 3 illustrates an example of a timing diagram that supports modifying access operations based on temperature projections in accordance with examples as disclosed herein.

Timing diagram 300 depicts a set of plots, including temperature plot 301, first derivative plot 302, second derivative plot 303, and time plot 304. Temperature plot 301 depicts a change in a temperature of a memory device over a time interval. First derivative plot 302 shows a first derivative of the temperature of the memory device over the time interval. Second derivative plot 303 shows a second derivative of the temperature of the memory device over the time interval. Time plot 304 shows discrete time points 345 of the time interval.

The first derivative shown in first derivative plot 302 may be computed by subtracting a temperature level of the memory device at two time points 345 and dividing the resulting difference by the time difference between the two time points 345. The second derivative shown in second derivative plot 303 may be computed by subtracting values of the first derivative at two time points 345 and dividing the resulting difference by the time difference between the two time points 345.

Temperature plot 301, first derivative plot 302, and second derivative plot 303 may also show thresholds (e.g., temperature thresholds, derivative thresholds) that are used to identify the occurrence of an event. For example, temperature plot 301 may include start measurement threshold 325, high temperature threshold 320, and stop measurement threshold 330. In some examples, start measurement threshold 325 and stop measurement threshold 330 have a same value or are combined into a single start/stop measurement threshold. In some examples, a value of start measurement threshold 325 is determined based on a worst-case rate of temperature increase of the memory device—e.g., caused by increased access operations. For example, start measurement threshold 325 may be selected to prevent a temperature of the memory device from exceeding an excessive temperature level assuming a worst-case exponential temperature increase. First derivative plot 302 may include one or more thresholds, including first derivative threshold 335. And second derivative plot 303 may include one or more thresholds, including second derivative threshold 340.

Timing diagram 300 may depict a state of the plots during different intervals of time (including first interval 350-1, second interval 350-2, and third interval 350-3) that are representative of scenarios that cover potential behaviors of a memory system—e.g., based on different temperature increases that may occur at a memory device.

During first interval 350-1, a controller of the memory device may monitor the temperature of the memory device. To monitor the temperature of the memory device, the controller may receive a signal (e.g., a voltage signal) from one or more temperature sensors positioned at or near the memory device. The controller of the memory device may sample the received signal (e.g., at time points 345) and determine a corresponding temperature level of the memory device.

At a beginning of first interval 350-1, a temperature of a memory device may be increasing linearly from an initial temperature level. The initial temperature level may be below start measurement threshold 325, and thus, a controller of the memory device may refrain from computing one or more derivatives of the temperature. At first time point 345-1, the temperature may satisfy (e.g., exceed, or meet or exceed) start measurement threshold 325, and, at first time point 345-1, the controller may detect the same—e.g., by comparing an indicated temperature level with the start measurement threshold 325. Based on (e.g., after) detecting that the indicated temperature level satisfies start measurement threshold 325, the controller may compute one or more derivatives of the temperature of the memory device—e.g., using current and prior indicated temperature levels. In some examples, the controller delays computing the temperature level until multiple consecutive temperature levels satisfy start measurement threshold 325—e.g., to avoid unnecessarily starting computations.

In some examples, the controller may compute a first derivative of the temperature based on (e.g., after) detecting that the start measurement threshold 325 has been satisfied, as shown by the first derivative of first derivative plot 302. Additionally, or alternatively, the controller may compute a second derivative of the temperature based on (e.g., after) detecting that the start measurement threshold 325 has been satisfied, as shown by the second derivative of second derivative plot 303.

The controller may then monitor, during monitoring period 305, one or both of the first derivative and second derivative to determine whether corresponding thresholds have been satisfied. In some examples, the controller determines that the first derivative satisfies first derivative threshold 335 during monitoring period 305. The controller may also determine that the second derivative is below second derivative threshold 340. Accordingly, the controller may determine that the increase in temperature of the memory device is caused by an increase in an ambient temperature. The controller may also predict a future temperature level of the memory device based on the current temperature level and the determination that an increase ambient temperature is a cause of the increased temperature of the memory device. In some examples, the controller predicts the future temperature level based on the current temperature level, a value of the first derivative (which may correspond to a slope of the temperature), and based on determining that the temperature will continue to increase linearly due to the increased ambient temperature.

Based on (e.g., after) determining, at second time point 345-2, that the first derivative satisfies first derivative threshold 335, the controller may initiate a throttling operation for the memory device. The throttling operation may be performed throughout throttling period 310. During throttling period 310, the controller may reduce one or more of a frequency of write operations to the memory device, a frequency of read operations from the memory device, a frequency of certain types of write or read operations (e.g., multi-level write or read operations) to the memory device, a frequency of folding operations, wear leveling operations, garbage collection operations, background refresh operations, scrub operations, block scan operations, and health monitoring operations. Each of the write operations, read operations, folding operations, wear leveling operations, garbage collection operations, background refresh operations, scrub operations, block scan operations, and health monitoring operations may be referred to as access operations. The controller may also delay operations that cause large temperature increases (relative to other operations) during throttling period 310 or reorder operations to balance the temperature increases caused by concurrent operations (e.g., single-level reads may be matched with garbage collection operations and single-level writes may be matched with folding operations).

In some examples, the controller supports different levels of throttling, where each level may be associated with different throttling parameters. For example, each set of throttling parameters may decrease a frequency of the access operations by a different percentage—e.g., a first level of throttling may cause a 5% reduction, a second level of throttling may cause a 10% reduction, and so on. Different values of the first derivative may be used to determine which level of throttling to apply, where the values may be linearly mapped to the different levels—e.g., a first value for the first derivative may map to the first throttling level, a second value for the first derivative may map to the second throttling level, a third value for the first derivative may map to the third throttling level, and so on. In some examples, the selected throttling level is based on a predicted temperature of the memory device—e.g., higher throttling levels may be selected for higher predicted temperatures than for lower predicted temperatures. For example, the selected throttling level may be based on a current measured temperature and the value of the first derivative.

In some examples, first derivative plot 302 includes multiple first derivative thresholds, where the first derivative thresholds are linearly mapped to corresponding throttling levels. In such cases, a throttling level may be selected based on the highest first derivative threshold currently satisfied by the first derivative of the temperature.

Accordingly, during throttling period 310, the temperature of the memory device may decrease (in some cases, after temporarily continuing to increase until an effect of the throttling is realized). The controller may maintain throttling operations until the temperature decreases below stop measurement threshold 330—e.g., until stop measurement threshold 330 is satisfied. Based on (e.g., after) detecting that the temperature has decreased below stop measurement threshold 330, the controller may stop throttling operations and return to a normal operating mode during normal period 315.

During second interval 350-2, the controller may also monitor the temperature of the memory device. At a beginning of second interval 350-2, a temperature of a memory device may be increasing exponentially from an initial temperature level that is below start measurement threshold 325. Thus, a controller of the memory device may refrain from computing one or more derivatives of the temperature. As similarly described above, the temperature may satisfy start measurement threshold 325, and the controller may detect the same and begin computing one or more derivatives of the temperature of the memory device.

In some examples, the controller may compute a first derivative of the temperature based on (e.g., after) detecting that the start measurement threshold 325 has been satisfied, as shown by the first derivative of first derivative plot 302. Additionally, or alternatively, the controller may compute a second derivative of the temperature based on (e.g., after) detecting that the start measurement threshold 325 has been satisfied, as shown by the second derivative of second derivative plot 303. Although shown prior to monitoring period 305, the first derivative and the second derivative may be at a zero value during this time—e.g., because the controller may not compute the first derivative or the second derivative until monitoring period 305 is initiated. Similarly, the first derivative and the second derivative may be at a zero value during throttling period 310, normal period 315, or both—e.g., to save computing resources and conserve energy.

The controller may then monitor, during a second monitoring period, one or both of the first derivative and second derivative to determine whether corresponding thresholds have been satisfied. In some examples, the controller determines that the first derivative satisfies first derivative threshold 335 during the second monitoring period. The controller may also determine that the second derivative satisfies second derivative threshold 340 during the second monitoring period. Accordingly, the controller may determine that the increase in temperature of the memory device is caused (at least in part) by an increase in access operations. The controller may also predict a future temperature level of the memory device based on the current temperature level and the determination that increased access operations is a cause of the increased temperature of the memory device. In some examples, the controller predicts the future temperature level based on the current temperature level, a value of the second derivative (which may correspond to a slope of the first derivative), and based on determining that the temperature will continue to increase exponentially due to the increased access operations.

Based on (e.g., after) determining, around fourth time point 345-4, that the second derivative satisfies second derivative threshold 340, the controller may initiate a throttling operation for the memory device. The throttling operation may be performed throughout a second throttling period, as similarly described above.

Different values of the second derivative may be used to determine which level of throttling to apply, where the values may be mapped to the different levels—e.g., a first value of the second derivative may map to the first throttling level, a second value of the second derivative may map to the second throttling level, a third value of the second derivative may map to the third throttling level, and so on. In some examples, the values of the second derivative mapped may be mapped exponentially to the throttling levels. For example, a corresponding increase in the value of the second derivative may be mapped to exponentially higher throttling levels as the value of the second derivative increases. In some examples, the selected throttling level is based on a predicted temperature of the memory device— e.g., higher throttling levels may be selected for higher predicted temperatures than for lower predicted temperatures. For example, the selected throttling level may be based on a current measured temperature and the value of the second derivative or based on the current measured temperature, the value of the first derivative, and the value of the second derivative.

In some examples, second derivative plot 303 includes multiple second derivative thresholds, where the second derivative thresholds are exponentially mapped to corresponding throttling levels. In such cases, a throttling level may be selected based on the highest second derivative threshold currently satisfied by the second derivative of the temperature.

In some examples, the level of throttling to apply is based on a relationship between the first derivative and the second derivative. For example, different levels of throttling may be applied if the value of the second derivative is above second derivative threshold 340 and the value of the first derivative is below first derivative threshold 335 when the temperature of the memory device is detected as satisfying (e.g., exceeding) start measurement threshold 325.

Accordingly, during the second throttling period, the temperature of the memory device may decrease (in some cases, after temporarily continuing to increase until an effect of the throttling is realized). The controller may maintain throttling operations until the temperature decreases below stop measurement threshold 330. Based on (e.g., after) detecting that the temperature has decreased below stop measurement threshold 330, the controller may stop throttling operations and return to a normal operating mode during the second normal period.

During third interval 350-3, the controller may also monitor the temperature of the memory device. At a beginning of third interval 350-3, a temperature of a memory device may be increasing linearly from an initial temperature level that is below start measurement threshold 325. Thus, a controller of the memory device may refrain from computing one or more derivatives of the temperature. As similarly described above, the temperature may satisfy start measurement threshold 325, and the controller may detect the same and begin computing one or more derivatives of the temperature of the memory device.

In some examples, the controller may compute a first derivative of the temperature based on (e.g., after) detecting that the start measurement threshold 325 has been satisfied, as shown by the first derivative of first derivative plot 302. Additionally, or alternatively, the controller may compute a second derivative of the temperature based on (e.g., after) detecting that the start measurement threshold 325 has been satisfied, as shown by the second derivative of second derivative plot 303.

The controller may then monitor, during a third monitoring period, one or both of the first derivative and second derivative to determine whether corresponding thresholds have been satisfied. In some examples, the controller determines that the first derivative is below first derivative threshold 335 and the second derivative is below second derivative threshold 340 during the third monitoring period. Accordingly, the controller may not determine whether the increase in temperature of the memory device is caused by an increased ambient temperature or increased access operations.

Around fifth time point 345-5, the controller may determine that the temperature of the memory device satisfies high temperature threshold 320. Accordingly, the controller may initiate a throttling operation for the memory device despite failing to detect one or both of the first derivate and second derivative satisfying the corresponding thresholds. The throttling operation may be performed throughout a third throttling period, as similarly described above. In some examples, a default throttling level is selected based on high temperature threshold 320 being satisfied—e.g., a lowest, intermediate, or highest throttling level.

Accordingly, during the third throttling period, the temperature of the memory device may decrease (in some cases, after temporarily continuing to increase until an effect of the throttling is realized). The controller may maintain throttling operations until the temperature decreases below stop measurement threshold 330. Based on (e.g., after) detecting that the temperature has decreased below stop measurement threshold 330, the controller may stop throttling operations and return to a normal operating mode.

In some examples, the controller may delay beginning a monitoring operation, throttling operation, or normal operation after detecting that a corresponding threshold has been satisfied. For example, the controller may wait to initiate the relevant operation until the corresponding parameter (e.g., temperature, first derivative, second derivative) has satisfied the corresponding threshold for a threshold duration (e.g., for a threshold quantity of time points).

In some examples, the temperature depicted in temperature plot 301, the first derivative shown in first derivative plot 302, and the second derivative shown in second derivative plot 303 are a result of a filtering operation used to prevent transients from improperly triggering one or more of monitoring operations, throttling operations, and the end of throttling operations.

Figure 4:
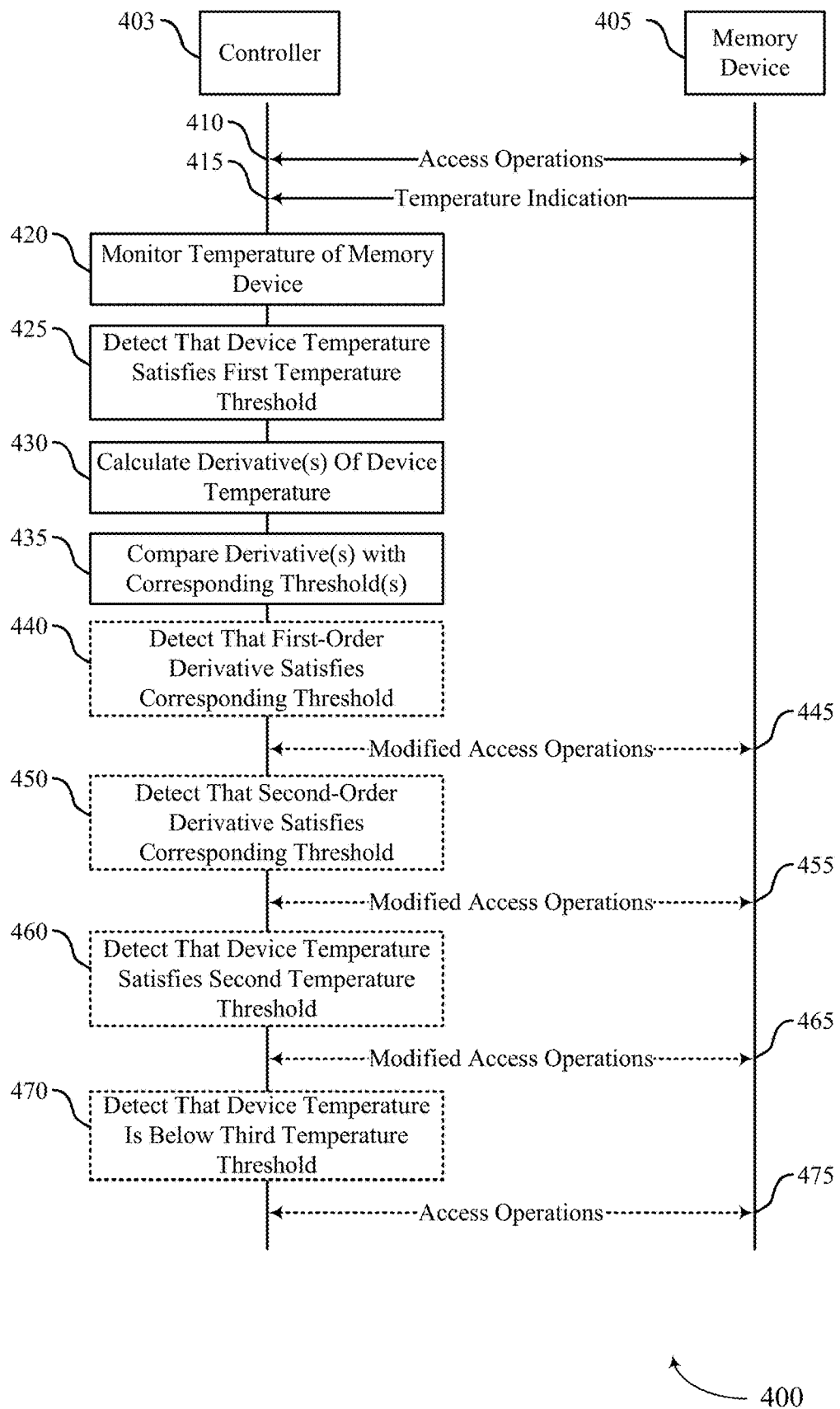
FIG. 4 illustrates an example of a set of operations that supports modifying access operations based on temperature projections in accordance with examples as disclosed herein.

FIG. 4 illustrates an example of a set of operations that supports modifying access operations based on temperature projections in accordance with examples as disclosed herein.

Process flow 400 may be performed by controller 403 and memory device 405. Controller 403 may be an example of a host system controller, a memory system controller, or a storage controller described herein. Memory device 405 may be an example of a memory device described herein. In some examples, process flow 400 illustrates an example set of operations performed to support modifying access operations based on temperature projections. For example, process flow 400 may include operations for throttling access operations at a memory device based on monitoring a temperature, and one or more derivatives of the temperature, of the memory device.

Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, when executed by a controller (e.g., the controller 403), may cause the controller to perform the operations of the process flow 400.

One or more of the operations described in process flow 400 may be performed earlier or later, omitted, replaced, supplemented, or combined with another operation. Also, additional operations described herein may replace, supplement, or be combined with one or more of the operations described in process flow 400.

At 410, one or more operations for accessing memory device 405 may be performed. In some examples, the access operations are initiated by controller 403—e.g., controller 403 may send write or read commands to memory device 405. In some examples, the access operations are initiated (internally) by memory device 405—e.g., memory device 405 may initiate garbage collection operations, folding operations, or other background operations. The one or more operations may be initiated and executed with a smallest latency supported by the memory device 405.

At 415, indications of a temperature of memory device 405 may be received at controller 403. The indications of the temperature may be indicative of temperature levels at memory device 405 at different time points. One or more temperature sensors at memory device 405 may be used to obtain the indications of the temperature. Controller 403 may continuously receive the indications of the temperature throughout the following operations.

At 420, a temperature of memory device 405 may be monitored. In some examples, controller 403 may monitor the temperature of memory device 405 by monitoring each indicated temperature level of the indicated temperature levels received from memory device 405. Monitoring the temperature may mapping the received indications of the temperature (which may be indicated by a voltage level of a signal received from memory device 405) to values that correspond to standard temperature measurements. Controller 403 may continue monitoring the temperature of memory device 405 throughout the following operations.

At 425, the temperature of memory device 405 may be detected as satisfying (e.g., exceeding) a temperature threshold. The temperature threshold may be referred to as a start measurement threshold. In some examples, a value of the temperature threshold is based on an expected increase in temperature that may occur after the temperature threshold is satisfied and after throttling operations are initiated—e.g., if the increase is caused by an increased ambient temperature, increased access activity, or both.

At 430, one or more derivatives of the temperature of memory device 405 may be calculated based on the temperature of memory device 405 satisfying a temperature threshold—e.g., by controller 403. In some examples, controller 403 calculates a first derivative of the temperature. Additionally, or alternatively, controller 403 may calculate a second derivative of the temperature.

At 435, the one or more calculated derivatives may be compared (e.g., by controller 403) with one or more corresponding thresholds. For example, if the one or more calculated derivatives include a first derivative, controller 403 may compare the first derivative with a first derivative threshold. In some examples, controller 403 may compare the first derivative with multiple first derivative thresholds. Additionally, or alternatively, if the one or more calculated derivatives include a second derivative, controller 403 may compare the second derivative with a second derivative threshold. In some examples, controller 403 may compare the second derivative with multiple second derivative thresholds. Controller 403 may continue comparing the derivatives with the derivative thresholds throughout the following operations—e.g., until a temperature of memory device 405 falls below a threshold that stops the measurement of derivatives.

At 440, the first-order derivative may be detected (e.g., by controller 403) as satisfying (e.g., exceeding, or meeting or exceeding) the first derivative threshold based on comparing the calculated first-order derivative with the first derivative threshold. In some examples, controller 403 determines a value of the first derivative, a difference between the first-order derivative and the first derivative threshold, or both. In some examples, controller 403 determines which first derivative thresholds of multiple first derivative thresholds are exceeded.

Based on determining that the first-order derivative satisfies one or more first derivative thresholds, controller 403 may modify access operations for memory device 405. In some examples, controller 403 may reduce a frequency of the access operations, reorder an occurrence of the access operations, or delay certain of the access operations. Controller 403 may determine a degree of modification based on the value of the first-order derivative. In some example, controller 403 may reduce the frequency of the access operations in accordance with a linear function that considers the value of the first-order derivative. For example, a first difference between the value of the first-order derivative and the first-order threshold may reduce the frequency by 5% (e.g., relative to an historical average of the access operation frequency, relative to a maximum supported access operation frequency), a second difference between the value of the first-order derivative and the first-order threshold may reduce the frequency by 10%, a third difference between the value of the first-order derivative and the first-order threshold may reduce the frequency by 15%, and so on. In some examples, the differences between the value of the first derivative and the first derivative threshold are mapped to throttling levels, where a first throttling level corresponds to the 5% reduction, a second throttling level corresponds to the 10% reduction, a third throttling level corresponds to the 15% reduction, and so on.

In some examples, some of the throttling levels (or a different set of throttling levels) do not correspond to percentage reductions in access operation frequency but instead relate to reordering, delaying, or modifying of access operations. For example, a first throttling level may correspond to performing certain access operations (instead of in an on-demand manner), a second throttling level may correspond to performing extended versions of one or more access operations, a third throttling level may correspond to delaying an access operation (e.g., multi-level write operation) until the temperature of memory device 405 falls below a threshold, and so on.

In some examples, controller 403 may delay, for a duration, modifying the access operations after the first-order derivative satisfies one or more first derivative thresholds—e.g., to first determine whether the second-order derivative will also satisfy one or more second derivative thresholds. In other examples, controller 403 may begin modifying the access operations immediately after the first-order derivative exceeds the one or more first derivative thresholds.

At 445, modified access operations may be performed between controller 403 and memory device 405 in accordance with the initiated modifications at 440. The modified access operations may include write operations (including single-level write operations and multi-level write operations), read operations (including single-level read operations and multi-level read operations), garbage collection, and folding operations.

At 450, the second-order derivative may be detected (e.g., by controller 403) as satisfying (e.g., exceeding, or meeting or exceeding) the second derivative threshold based on comparing the calculated second-order derivative with the second derivative threshold. In some examples, controller 403 determines a value of the second derivative, a difference between second-order derivative and the second derivative threshold, or both. In some examples, controller 403 determines which second derivative thresholds of multiple second derivative thresholds are satisfied (e.g., exceeded, or meet or exceeded).

Based on determining that the second-order derivative satisfies one or more second derivative thresholds, controller 403 may modify access operations for memory device 405. In some examples, controller 403 may reduce a frequency of the access operations, reorder an occurrence of the access operations, or delay certain of the access operations. Controller 403 may determine a degree of modification based on the value of the second-order derivative. In some example, controller 403 may reduce the frequency of the access operations in accordance with a non-linear (e.g., exponential) function that considers the value of the second-order derivative. For example, a first difference between the value of the second-order derivative and the first-order threshold may reduce the frequency by 5%, while a second difference that is two times the first difference may reduce the frequency by 20%, and so on. In some examples, the differences between the value of the second-order derivative and the second-order derivative threshold are mapped to throttling levels, where a first throttling level corresponds to the 5% reduction, a second throttling level corresponds to the 10% reduction, a third throttling level corresponds to a 15% reduction, a fourth throttling level corresponds to a 20% reduction and so on. In some examples, some of the throttling levels (or a different set of throttling levels) do not correspond to percentage reductions in access operation frequency but instead relate to reordering, delaying, or modifying of access operations.

In some examples, if both the first-order derivative threshold and the second-order derivative threshold have been satisfied, controller 403 modifies the access operations in accordance with the non-linear function. In other examples, if both the first-order derivative threshold and the second-order derivative threshold have been satisfied, controller 403 modifies the access operations in accordance with a non-linear function that increases the throttling level at a faster rate than the non-linear function used when only the second-order derivative threshold is satisfied.

At 455, modified access operations may be performed between controller 403 and memory device 405 in accordance with the initiated modifications at 450. The modified access operations may include write operations (including single-level write operations and multi-level write operations), read operations (including single-level read operations and multi-level read operations), garbage collection, and folding operations.

At 460, the temperature of the memory device 405 may be detected (e.g., by controller 403) as satisfying (e.g., exceeding, or meeting or exceeding) a second temperature threshold based on the continued monitoring of the temperature. The second temperature threshold may be referred to as a high temperature threshold.

Based on determining that the temperature satisfies the second temperature threshold, controller 403 may modify access operations for memory device 405. In some examples, controller 403 selects a predetermined throttling level when then second temperature threshold is satisfied— e.g., the intermediate throttling level. In some examples, controller 403 modifies the access operations only if the access operations have not already been modified as a result of one or both of the first-order derivative and the second-order derivative satisfying corresponding derivative thresholds. In some examples, if one or both of the first derivative threshold and the second derivative threshold are satisfied and throttling operations are in progress, controller 403 increases a throttling level selected relative to the current throttling level.

In some examples, the temperature of memory device 405 is compared against multiple high temperature thresholds, where each high temperature threshold may be mapped to different throttling levels—e.g., the highest temperature threshold may be mapped to the highest throttling level.

At 465, modified access operations may be performed between controller 403 and memory device 405 in accordance with the initiated modifications at 460. The modified access operations may include write operations (including single-level write operations and multi-level write operations), read operations (including single-level read operations and multi-level read operations), garbage collection, and folding operations.

At 470, the temperature of memory device 405 may be detected as being below a third temperature threshold based on the continued monitoring of the temperature—e.g., because initiated throttling operations may cause/allow the temperature of memory device 405 to decrease. That is, the third temperature threshold may be satisfied. The third temperature threshold may be referred to as the stop measurement threshold. The third temperature threshold may be the same as or less than (e.g., to prevent frequent oscillations between the derivative monitoring and non-monitoring states) the start measurement threshold.

In some examples, controller 403 may initiate throttling operations when the temperature of memory device 405 satisfies the start measurement threshold for a duration without one or both of the first-order derivative or the second-order derivative satisfying a corresponding derivative threshold.

At 475, normal (nonmodified) access operations may be performed between controller 403 and memory device 405.

Figure 5:
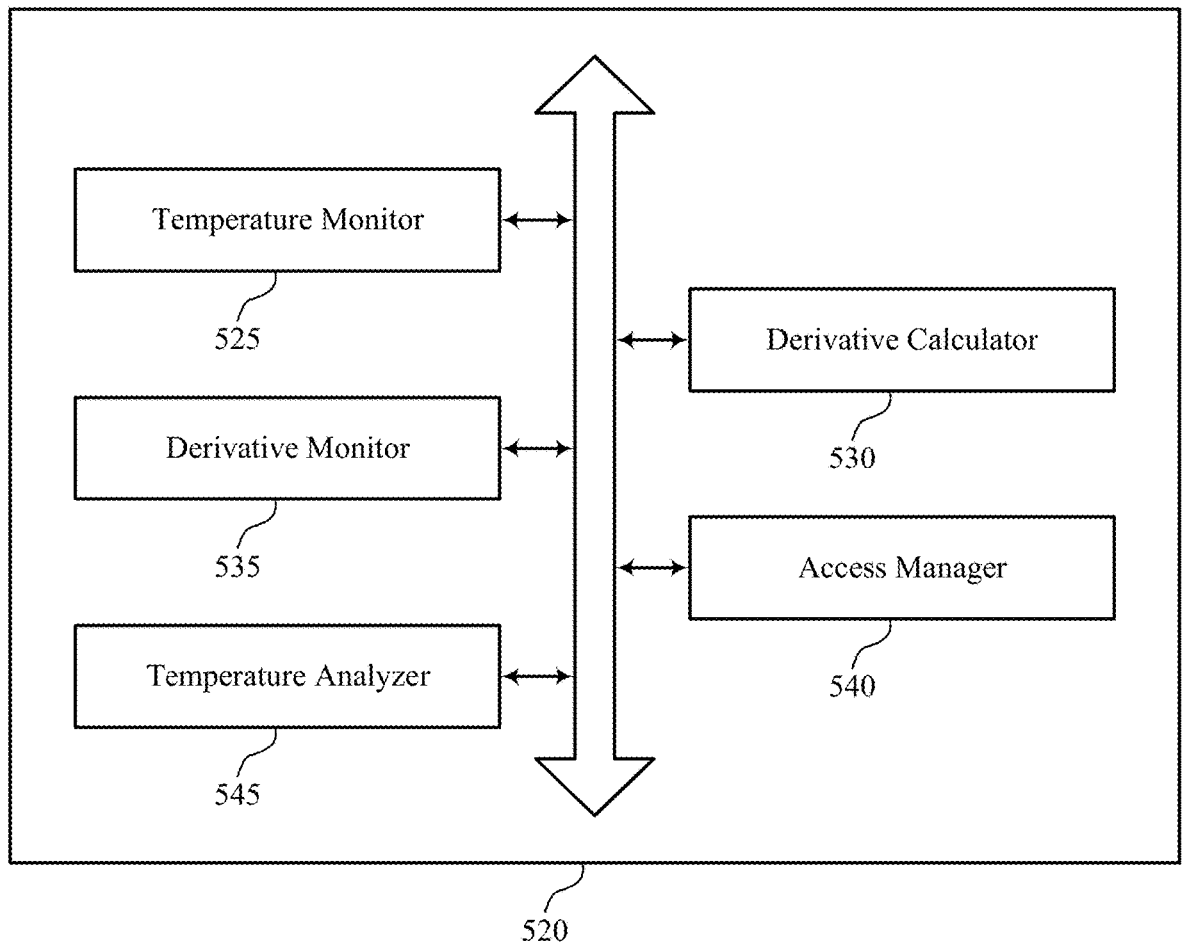
FIG. 5 shows a block diagram of a controller that supports modifying access operations based on temperature projections in accordance with examples as disclosed herein.

FIG. 5 shows a block diagram 500 of a controller 520 that supports modifying access operations based on temperature projections in accordance with examples as disclosed herein. The controller 520 may be an example of aspects of a controller as described with reference to FIGS. 1 through 4. The controller 520, or various components thereof, may be an example of means for performing various aspects of modifying access operations based on temperature projections as described herein. For example, the controller 520 may include a temperature monitor 525, a derivative calculator 530, a derivative monitor 535, an access manager 540, a temperature analyzer 545, or any combination thereof. Each of these components may communicate, directly or indirectly, with one another (e.g., via one or more buses).

The temperature monitor 525 may be configured as or otherwise support a means for receiving a plurality of indications of corresponding temperature levels of a memory device, each indication of the plurality of indications associated with a respective time point of a plurality of time points. The derivative calculator 530 may be configured as or otherwise support a means for calculating, based at least in part on an indication of the plurality of indications corresponding to a temperature level of the memory device that satisfies a first threshold, a derivative of a temperature of the memory device over a duration spanning at least two time points of the plurality of time points. The derivative monitor 535 may be configured as or otherwise support a means for determining whether the derivative satisfies a second threshold based at least in part on the calculating. The access manager 540 may be configured as or otherwise support a means for modifying one or more operations for accessing the memory device if the derivative satisfies the second threshold.

In some examples, the derivative calculator 530 may be configured as or otherwise support a means for calculating, based at least in part on the temperature level of the memory device satisfying the first threshold, a second derivative of the temperature of the memory device over the duration, the derivative being a first-order derivative and the second derivative being a second-order derivative. In some examples, the access manager 540 may be configured as or otherwise support a means for modifying the one or more operations for accessing the memory device based at least in part on the second derivative satisfying a third threshold.

In some examples, the derivative calculator 530 may be configured as or otherwise support a means for determining that the derivative satisfies the second threshold based at least in part on calculating the derivative. In some examples, the access manager 540 may be configured as or otherwise support a means for modifying the one or more operations for accessing the memory device according to a first function based at least in part on the derivative satisfying the second threshold.

In some examples, the derivative calculator 530 may be configured as or otherwise support a means for calculating, based at least in part on the temperature level of the memory device satisfying the first threshold, a second derivative of the temperature of the memory device over the duration, the derivative being a first-order derivative and the second derivative being a second-order derivative. In some examples, the derivative monitor 535 may be configured as or otherwise support a means for determining that the second derivative satisfies a third threshold based at least in part on calculating the second derivative. In some examples, the access manager 540 may be configured as or otherwise support a means for modifying the one or more operations for accessing the memory device according to a second function based at least in part on the second derivative satisfying the third threshold, an effect of the second function on the one or more operations for accessing the memory device being greater than an effect of the first function on the one or more operations for accessing the memory device.

In some examples, modifying the one or more operations according to the first function includes modifying the one or more operations for accessing the memory device based at least in part on the derivative of the temperature, the first function including a linear relationship between the derivative and a frequency of the one or more operations for accessing the memory device. In some examples, modifying the one or more operations according to the second function includes modifying the one or more operations for accessing the memory device based at least in part on the second derivative of the temperature, the second function including an exponential relationship between the derivative and the frequency of the one or more operations for accessing the memory device.

In some examples, the temperature monitor 525 may be configured as or otherwise support a means for determining, based at least in part on modifying the one or more operations for accessing the memory device, that a second indication of the plurality of indications corresponding to a second temperature level of the memory device is less than a third threshold, the second indication occurring after the indication and the third threshold being less than the first threshold. In some examples, the access manager 540 may be configured as or otherwise support a means for terminate the modification of the one or more operations for accessing the memory device based at least in part on the second temperature level being less than the third threshold.

In some examples, the temperature monitor 525 may be configured as or otherwise support a means for determining that the temperature level of the memory device satisfies the first threshold, where the derivative of the temperature of the memory device, a second derivative of the temperature of the memory device, or both, is calculated based at least in part on the temperature satisfying the first threshold, the derivative being a first-order derivative and the second derivative being a second-order derivative.

In some examples, to support modifying the one or more operations for accessing the memory device, the access manager 540 may be configured as or otherwise support a means for reducing a frequency of write operations to the memory device.

In some examples, the temperature monitor 525 may be configured as or otherwise support a means for determining that a second temperature level of the memory device corresponding to a second indication of the plurality of indications is greater than a third threshold, the second indication occurring after the indication and the third threshold being less than the first threshold, where the one or more operations for accessing the memory device is modified based at least in part on the second temperature level being greater than the third threshold.

In some examples, the derivative is a first-order derivative or a second-order derivative.

In some examples, the access operations include one or more of write operations, read operations, garbage collection operations, and folding operations.

In some examples, the temperature monitor 525 may be configured as or otherwise support a means for receiving a plurality of indications of corresponding temperature levels of the memory device at a plurality of time points. The temperature analyzer 545 may be configured as or otherwise support a means for determining a cause of an increase in a temperature of the memory device based at least in part on an indication of the plurality of indications corresponding to a temperature level of the memory device that satisfies a threshold. In some examples, the access manager 540 may be configured as or otherwise support a means for modifying one or more operations for accessing the memory device based at least in part on the cause of the increase in the temperature of the memory device.

In some examples, the temperature analyzer 545 may be configured as or otherwise support a means for determining that the cause of the increase in the temperature of the memory device is an increase in an ambient temperature, an increase in a frequency of access operations at the memory device, or both.

In some examples, the derivative calculator 530 may be configured as or otherwise support a means for calculating, based at least in part on the temperature level of the memory device satisfying the threshold, a first-order derivative of the temperature of the memory device over a duration spanning at least two time points of the plurality of time points, where the cause of the increase in the temperature of the memory device is determined to be an increase in the ambient temperature based at least in part on the first-order derivative satisfying a second threshold.

In some examples, the derivative calculator 530 may be configured as or otherwise support a means for calculating, based at least in part on the temperature level of the memory device satisfying the threshold, a second-order derivative of the temperature of the memory device over a duration spanning at least two time points of the plurality of time points, where the cause of the increase in the temperature of the memory device is determined to be an increase in the frequency of access operations based at least in part on the second-order derivative satisfying a second threshold.

In some examples, the derivative calculator 530 may be configured as or otherwise support a means for calculating, based at least in part on the temperature level of the memory device satisfying the threshold, a first-order derivative of the temperature of the memory device and a second-order derivative of the temperature of the memory device over a duration spanning at least two time points of the plurality of time points, where the cause of the increase in the temperature of the memory device is determined based at least in part on the temperature levels of the memory device, the first-order derivative, the second-order derivative, a frequency of previously received access commands, or any combination thereof.

In some examples, the access manager 540 may be configured as or otherwise support a means for modifying the one or more operations for accessing the memory device in a linear manner based at least in part on the increase in the temperature of the memory device being caused by an increase in an ambient temperature.

In some examples, the access manager 540 may be configured as or otherwise support a means for modifying the one or more operations for accessing the memory device in an exponential manner based at least in part on the increase in the temperature of the memory device being caused by an increase in frequency of access operations at the memory device.

In some examples, the temperature analyzer 545 may be configured as or otherwise support a means for estimating, at a first time based at least in part on the determined cause of the increase in the temperature of the memory device, a projected temperature level of the memory device at a second time that is separated from the first time by a duration, where the one or more operations for accessing the memory device is modified based at least in part on the projected temperature level.

Figure 6:
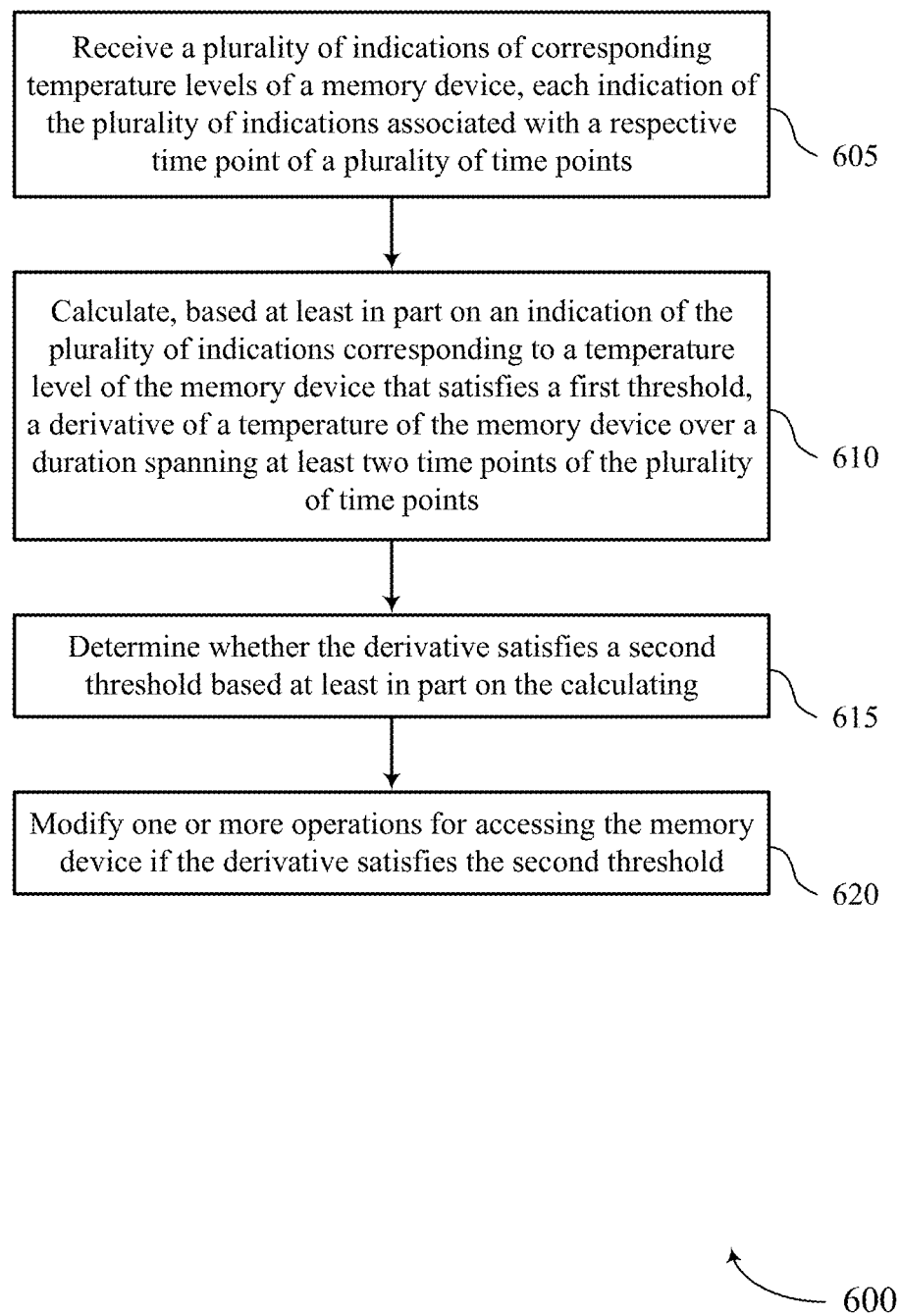
FIGS. 6 and 7 show sets of operations illustrating a method or methods that support modifying access operations based on temperature projections in accordance with examples as disclosed herein.

FIG. 6 shows a set of operations illustrating a method that supports modifying access operations based on temperature projections in accordance with examples as disclosed herein. The operations of method 600 may be implemented by a controller or its components as described herein. For example, the operations of method 600 may be performed by a controller as described with reference to FIGS. 1 through 5. In some examples, a controller may execute a set of instructions to control the functional elements of the device to perform the described functions. Additionally, or alternatively, the controller may perform aspects of the described functions using special-purpose hardware.

At 605, the method may include receiving a plurality of indications of corresponding temperature levels of a memory device, each indication of the plurality of indications associated with a respective time point of a plurality of time points. The operations of 605 may be performed in accordance with examples as disclosed herein. In some examples, aspects of the operations of 605 may be performed by a temperature monitor 525 as described with reference to FIG. 5.

At 610, the method may include calculating, based at least in part on an indication of the plurality of indications corresponding to a temperature level of the memory device that satisfies a first threshold, a derivative of a temperature of the memory device over a duration spanning at least two time points of the plurality of time points. The operations of 610 may be performed in accordance with examples as disclosed herein. In some examples, aspects of the operations of 610 may be performed by a derivative calculator 530 as described with reference to FIG. 5.

At 615, the method may include determining whether the derivative satisfies a second threshold based at least in part on the calculating. The operations of 615 may be performed in accordance with examples as disclosed herein. In some examples, aspects of the operations of 615 may be performed by a derivative monitor 535 as described with reference to FIG. 5.

At 620, the method may include modifying one or more operations for accessing the memory device if the derivative satisfies the second threshold. The operations of 620 may be performed in accordance with examples as disclosed herein. In some examples, aspects of the operations of 620 may be performed by an access manager 540 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for receiving a plurality of indications of corresponding temperature levels of a memory device, each indication of the plurality of indications associated with a respective time point of a plurality of time points; calculating, based at least in part on an indication of the plurality of indications corresponding to a temperature level of the memory device that satisfies a first threshold, a derivative of a temperature of the memory device over a duration spanning at least two time points of the plurality of time points; determining whether the derivative satisfies a second threshold based at least in part on the calculating; and modifying one or more operations for accessing the memory device if the derivative satisfies the second threshold.

Aspect 2: The apparatus of aspect 1, further including operations, features, circuitry, logic, means, or instructions, or any combination thereof for calculating, based at least in part on the temperature level of the memory device satisfying the first threshold, a second derivative of the temperature of the memory device over the duration, the derivative being a first-order derivative and the second derivative being a second-order derivative and modifying the one or more operations for accessing the memory device based at least in part on the second derivative satisfying a third threshold.

Aspect 3: The apparatus of any of aspects 1 through 2, further including operations, features, circuitry, logic, means, or instructions, or any combination thereof for determining that the derivative satisfies the second threshold based at least in part on calculating the derivative and modifying the one or more operations for accessing the memory device according to a first function based at least in part on the derivative satisfying the second threshold.

Aspect 4: The apparatus of aspect 3, further including operations, features, circuitry, logic, means, or instructions, or any combination thereof for calculating, based at least in part on the temperature level of the memory device satisfying the first threshold, a second derivative of the temperature of the memory device over the duration, the derivative being a first-order derivative and the second derivative being a second-order derivative; determining that the second derivative satisfies a third threshold based at least in part on calculating the second derivative; and modifying the one or more operations for accessing the memory device according to a second function based at least in part on the second derivative satisfying the third threshold, an effect of the second function on the one or more operations for accessing the memory device being greater than an effect of the first function on the one or more operations for accessing the memory device.

Aspect 5: The apparatus of aspect 4, further including operations, features, circuitry, logic, means, or instructions, or any combination thereof for modifying the one or more operations according to the first function includes modifying the one or more operations for accessing the memory device based at least in part on the derivative of the temperature, the first function including a linear relationship between the derivative and a frequency of the one or more operations for accessing the memory device and modifying the one or more operations according to the second function includes modifying the one or more operations for accessing the memory device based at least in part on the second derivative of the temperature, the second function including an exponential relationship between the derivative and the frequency of the one or more operations for accessing the memory device.

Aspect 6: The apparatus of any of aspects 3 through 5, further including
operations, features, circuitry, logic, means, or instructions, or any combination thereof for determining, based at least in part on modifying the one or more operations for accessing the memory device, that a second indication of the plurality of indications corresponding to a second temperature level of the memory device is less than a third threshold, the second indication occurring after the indication and the third threshold being less than the first threshold and terminate the modification of the one or more operations for accessing the memory device based at least in part on the second temperature level being less than the third threshold.

Aspect 7: The apparatus of any of aspects 1 through 6, further including operations, features, circuitry, logic, means, or instructions, or any combination thereof for determining that the temperature level of the memory device satisfies the first threshold, where the derivative of the temperature of the memory device, a second derivative of the temperature of the memory device, or both, is calculated based at least in part on the temperature satisfying the first threshold, the derivative being a first-order derivative and the second derivative being a second-order derivative.

Aspect 8: The apparatus of any of aspects 1 through 7 where modifying the one or more operations for accessing the memory device, further includes operations, features, circuitry, logic, means, or instructions, or any combination thereof for reducing a frequency of write operations to the memory device.

Aspect 9: The apparatus of any of aspects 1 through 8, further including operations, features, circuitry, logic, means, or instructions, or any combination thereof for determining that a second temperature level of the memory device corresponding to a second indication of the plurality of indications is greater than a third threshold, the second indication occurring after the indication and the third threshold being less than the first threshold, where the one or more operations for accessing the memory device is modified based at least in part on the second temperature level being greater than the third threshold.

Aspect 10: The apparatus of any of aspects 1 through 9, further including operations, features, circuitry, logic, means, or instructions, or any combination thereof for the derivative is a first-order derivative or a second-order derivative.

Aspect 11: The apparatus of any of aspects 1 through 10, further including operations, features, circuitry, logic, means, or instructions, or any combination thereof for the access operations include one or more of write operations, read operations, garbage collection operations, and folding operations.

Figure 7:
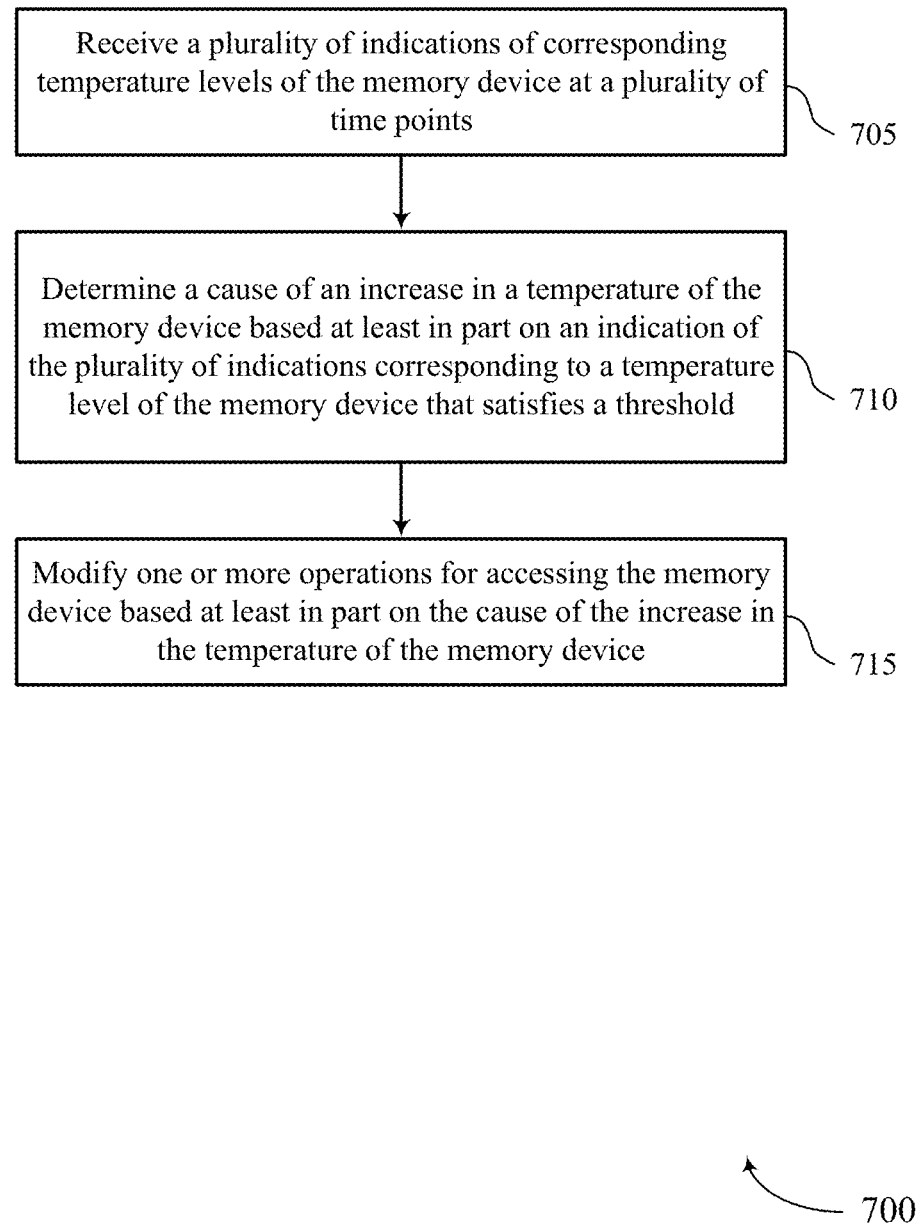

FIG. 7 shows a set of operations illustrating a method that supports modifying access operations based on temperature projections in accordance with examples as disclosed herein. The operations of method 700 may be implemented by a controller or its components as described herein. For example, the operations of method 700 may be performed by a controller as described with reference to FIGS. 1 through 5. In some examples, a controller may execute a set of instructions to control the functional elements of the device to perform the described functions. Additionally, or alternatively, the controller may perform aspects of the described functions using special-purpose hardware.

At 705, the method may include receiving a plurality of indications of corresponding temperature levels of the memory device at a plurality of time points. The operations of 705 may be performed in accordance with examples as disclosed herein. In some examples, aspects of the operations of 705 may be performed by a temperature monitor 525 as described with reference to FIG. 5.

At 710, the method may include determining a cause of an increase in a temperature of the memory device based at least in part on an indication of the plurality of indications corresponding to a temperature level of the memory device that satisfies a threshold. The operations of 710 may be performed in accordance with examples as disclosed herein. In some examples, aspects of the operations of 710 may be performed by a temperature analyzer 545 as described with reference to FIG. 5.

At 715, the method may include modifying one or more operations for accessing the memory device based at least in part on the cause of the increase in the temperature of the memory device. The operations of 715 may be performed in accordance with examples as disclosed herein. In some examples, aspects of the operations of 715 may be performed by an access manager 540 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor), or any combination thereof for performing the following aspects of the present disclosure:

Aspect 12: The apparatus, including features, circuitry, logic, means, or instructions, or any combination thereof for receiving a plurality of indications of corresponding temperature levels of the memory device at a plurality of time points; determining a cause of an increase in a temperature of the memory device based at least in part on an indication of the plurality of indications corresponding to a temperature level of the memory device that satisfies a threshold; and modifying one or more operations for accessing the memory device based at least in part on the cause of the increase in the temperature of the memory device.

Aspect 13: The apparatus of aspect 12, further including operations, features, circuitry, logic, means, or instructions, or any combination thereof for determining that the cause of the increase in the temperature of the memory device is an increase in an ambient temperature, an increase in a frequency of access operations at the memory device, or both.

Aspect 14: The apparatus of aspect 13, further including operations, features, circuitry, logic, means, or instructions, or any combination thereof for calculating, based at least in part on the temperature level of the memory device satisfying the threshold, a first-order derivative of the temperature of the memory device over a duration spanning at least two time points of the plurality of time points, where the cause of the increase in the temperature of the memory device is determined to be an increase in the ambient temperature based at least in part on the first-order derivative satisfying a second threshold.

Aspect 15: The apparatus of any of aspects 13 through 14, further including operations, features, circuitry, logic, means, or instructions, or any combination thereof for calculating, based at least in part on the temperature level of the memory device satisfying the threshold, a second-order derivative of the temperature of the memory device over a duration spanning at least two time points of the plurality of time points, where the cause of the increase in the temperature of the memory device is determined to be an increase in the frequency of access operations based at least in part on the second-order derivative satisfying a second threshold.

Aspect 16: The apparatus of any of aspects 13 through 15, further including operations, features, circuitry, logic, means, or instructions, or any combination thereof for calculating, based at least in part on the temperature level of the memory device satisfying the threshold, a first-order derivative of the temperature of the memory device and a second-order derivative of the temperature of the memory device over a duration spanning at least two time points of the plurality of time points, where the cause of the increase in the temperature of the memory device is determined based at least in part on the temperature levels of the memory device, the first-order derivative, the second-order derivative, a frequency of previously received access commands, or any combination thereof.

Aspect 17: The apparatus of any of aspects 12 through 16, further including operations, features, circuitry, logic, means, or instructions, or any combination thereof for modifying the one or more operations for accessing the memory device in a linear manner based at least in part on the increase in the temperature of the memory device being caused by an increase in an ambient temperature.

Aspect 18: The apparatus of any of aspects 12 through 17, further including operations, features, circuitry, logic, means, or instructions, or any combination thereof for modifying the one or more operations for accessing the memory device in an exponential manner based at least in part on the increase in the temperature of the memory device being caused by an increase in frequency of access operations at the memory device.

Aspect 19: The apparatus of any of aspects 12 through 18, further including operations, features, circuitry, logic, means, or instructions, or any combination thereof for estimating, at a first time based at least in part on the determined cause of the increase in the temperature of the memory device, a projected temperature level of the memory device at a second time that is separated from the first time by a duration, where the one or more operations for accessing the memory device is modified based at least in part on the projected temperature level.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 20: An apparatus, including: a memory device; and a controller coupled with the memory device and configured to cause the apparatus to: receive a plurality of indications of corresponding temperature levels of the memory device, each indication of the plurality of indications associated with a respective time point of a plurality of time points; calculate, based at least in part on an indication of the plurality of indications corresponding to a temperature level of the memory device that satisfies a first threshold, a derivative of a temperature of the memory device over a duration spanning at least two time points of the plurality of time points; determine whether the derivative satisfies a second threshold based at least in part on the calculating; and modify one or more operations for accessing the memory device if the derivative satisfies the second threshold.

Aspect 21: The apparatus of aspect 20, where the controller is further configured to cause the apparatus to: calculate, based at least in part on the temperature level of the memory device satisfying the first threshold, a second derivative of the temperature of the memory device over the duration, the derivative being a first-order derivative and the second derivative being a second-order derivative; and modify the one or more operations for accessing the memory device based at least in part on the second derivative satisfying a third threshold.

Aspect 22: The apparatus of any of aspects 20 through 21, where the controller is further configured to cause the apparatus to: determine that the derivative satisfies the second threshold based at least in part on calculating the derivative; and modify the one or more operations for accessing the memory device according to a first function based at least in part on the derivative satisfying the second threshold.

Aspect 23: The apparatus of aspect 22, where the controller is further configured to cause the apparatus to: calculate, based at least in part on the temperature level of the memory device satisfying the first threshold, a second derivative of the temperature of the memory device over the duration, the derivative being a first-order derivative and the second derivative being a second-order derivative; determine that the second derivative satisfies a third threshold based at least in part on calculating the second derivative; and modify the one or more operations for accessing the memory device according to a second function based at least in part on the second derivative satisfying the third threshold, an effect of the second function on the one or more operations for accessing the memory device being greater than an effect of the first function on the one or more operations for accessing the memory device.

Aspect 24: The apparatus of aspect 23, where: to modify the one or more operations according to the first function, the controller is further configured to modify the one or more operations for accessing the memory device based at least in part on the derivative of the temperature, the first function including a linear relationship between the derivative and a frequency of the one or more operations for accessing the memory device; and to modify the one or more operations according to the second function, the controller is further configured to modify the one or more operations for accessing the memory device based at least in part on the second derivative of the temperature, the second function including an exponential relationship between the derivative and the frequency of the one or more operations for accessing the memory device.

Aspect 25: The apparatus of any of aspects 22 through 24, where the controller is further configured to cause the apparatus to: determine, based at least in part on modifying the one or more operations for accessing the memory device, that a second indication of the plurality of indications corresponding to a second temperature level of the memory device is less than a third threshold, the second indication occurring after the indication and the third threshold being less than the first threshold; and terminate the modification of the one or more operations for accessing the memory device based at least in part on the second temperature level being less than the third threshold.

Aspect 26: The apparatus of any of aspects 20 through 25, where the controller is further configured to cause the apparatus to: determine that the temperature level of the memory device satisfies the first threshold, where the derivative of the temperature of the memory device, a second derivative of the temperature of the memory device, or both, is calculated based at least in part on the temperature satisfying the first threshold, the derivative being a first-order derivative and the second derivative being a second-order derivative.

Aspect 27: The apparatus of any of aspects 20 through 26, where, to modify the one or more operations for accessing the memory device, the controller is further configured to: reduce a frequency of write operations to the memory device.

Aspect 28: The apparatus of any of aspects 20 through 27, where the controller is further configured to cause the apparatus to: determine that a second temperature level of the memory device corresponding to a second indication of the plurality of indications is greater than a third threshold, the second indication occurring after the indication and the third threshold being less than the first threshold, where the one or more operations for accessing the memory device is modified based at least in part on the second temperature level being greater than the third threshold.

Aspect 29: The apparatus of any of aspects 20 through 28, where the derivative is a first-order derivative or a second-order derivative.

Aspect 30: The apparatus of any of aspects 20 through 29, where the access operations include one or more of write operations, read operations, garbage collection operations, and folding operations.

An apparatus is described. The following provides an overview of aspects of the apparatus as described herein:

Aspect 31: An apparatus, including: a memory device; and a controller coupled with the memory device and configured to cause the apparatus to: receive a plurality of indications of corresponding temperature levels of the memory device at a plurality of time points; determine a cause of an increase in a temperature of the memory device based at least in part on an indication of the plurality of indications corresponding to a temperature level of the memory device that satisfies a threshold; and modify one or more operations for accessing the memory device based at least in part on the cause of the increase in the temperature of the memory device.

Aspect 32: The apparatus of aspect 31, where the controller is further configured to cause the apparatus to: determine that the cause of the increase in the temperature of the memory device is an increase in an ambient temperature, an increase in a frequency of access operations at the memory device, or both.

Aspect 33: The apparatus of aspect 32, where the controller is further configured to cause the apparatus to: calculate, based at least in part on the temperature level of the memory device satisfying the threshold, a first-order derivative of the temperature of the memory device over a duration spanning at least two time points of the plurality of time points, where the cause of the increase in the temperature of the memory device is determined to be an increase in the ambient temperature based at least in part on the first-order derivative satisfying a second threshold.

Aspect 34: The apparatus of any of aspects 32 through 33, where the controller is further configured to cause the apparatus to: calculate, based at least in part on the temperature level of the memory device satisfying the threshold, a second-order derivative of the temperature of the memory device over a duration spanning at least two time points of the plurality of time points, where the cause of the increase in the temperature of the memory device is determined to be an increase in the frequency of access operations based at least in part on the second-order derivative satisfying a second threshold.

Aspect 35: The apparatus of any of aspects 32 through 34, where the controller is further configured to cause the apparatus to: calculate, based at least in part on the temperature level of the memory device satisfying the threshold, a first-order derivative of the temperature of the memory device and a second-order derivative of the temperature of the memory device over a duration spanning at least two time points of the plurality of time points, where the cause of the increase in the temperature of the memory device is determined based at least in part on the temperature levels of the memory device, the first-order derivative, the second-order derivative, a frequency of previously received access commands, or any combination thereof.

Aspect 36: The apparatus of any of aspects 31 through 35, where the controller is further configured to cause the apparatus to: modify the one or more operations for accessing the memory device in a linear manner based at least in part on the increase in the temperature of the memory device being caused by an increase in an ambient temperature.

Aspect 37: The apparatus of any of aspects 31 through 36, where the controller is further configured to cause the apparatus to: modify the one or more operations for accessing the memory device in an exponential manner based at least in part on the increase in the temperature of the memory device being caused by an increase in frequency of access operations at the memory device.

Aspect 38: The apparatus of any of aspects 31 through 37, where the controller is further configured to cause the apparatus to: estimate, at a first time based at least in part on the determined cause of the increase in the temperature of the memory device, a projected temperature level of the memory device at a second time that is separated from the first time by a duration, where the one or more operations for accessing the memory device is modified based at least in part on the projected temperature level.

An apparatus is described. The following provides an overview of aspects of the apparatus as described herein:

Aspect 39: A non-transitory, computer-readable medium storing code including instructions which, when executed by a processor of an electronic device, cause the electronic device to: receive a plurality of indications of corresponding temperature levels of a memory device at a plurality of time points; calculate, based at least in part on an indication of the plurality of indications corresponding to a temperature level of the memory device that satisfies a first threshold, a derivative of a temperature of the memory device over a duration spanning at least two time points of the plurality of time points; determine whether the derivative satisfies a second threshold based at least in part on the calculating; and modify one or more operations for accessing the memory device if the derivative satisfies the second threshold.

Aspect 40: The non-transitory, computer-readable medium of aspect 39, where the instructions, when executed by the processor of the electronic device, further cause the electronic device to: calculate, based at least in part on the temperature level of the memory device satisfying the first threshold, a second derivative of the temperature of the memory device over the duration, the derivative being a first-order derivative and the second derivative being a second-order derivative; and modify the one or more operations for accessing the memory device based at least in part on the second derivative satisfying a third threshold.

Aspect 41: The non-transitory, computer-readable medium of any of aspects 39 through 40, where the instructions, when executed by the processor of the electronic device, further cause the electronic device to: determine that the derivative satisfies the second threshold based at least in part on calculating the derivative; and modify the one or more operations for accessing the memory device according to a first function based at least in part on the derivative satisfying the second threshold.

Aspect 42: The non-transitory, computer-readable medium of any of aspects 39 through 41, where the instructions, when executed by the processor of the electronic device, further cause the electronic device to: determine that the temperature level of the memory device satisfies the first threshold, where the derivative of the temperature of the memory device, a second derivative of the temperature of the memory device, or both, is calculated based at least in part on the temperature satisfying the first threshold, the derivative being a first-order derivative and the second derivative being a second-order derivative.

An apparatus is described. The following provides an overview of aspects of the apparatus as described herein:

Aspect 43: A non-transitory, computer-readable medium storing code including instructions which, when executed by a processor of an electronic device, cause the electronic device to: receive a plurality of indications of corresponding temperature levels of a memory device at a plurality of time points; determine a cause of an increase in a temperature of the memory device based at least in part on an indication of the plurality of indications corresponding to a temperature level of the memory device that satisfies a threshold; and modify one or more operations for accessing the memory device based at least in part on the cause of the increase in the temperature of the memory device.

Aspect 44: The non-transitory, computer-readable medium of aspect 43, where the instructions, when executed by the processor of the electronic device, further cause the electronic device to: determine that the cause of the increase in the temperature of the memory device is an increase in an ambient temperature, an increase in a frequency of access operations at the memory device, or both.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   one or more controllers coupled with the one or more memory devices and configured to cause the memory system to:
      determine, in accordance with a plurality of temperature levels of a memory device at a plurality of time points, which one of a change in an ambient temperature and a change in a frequency of access operations at the memory device is a cause of an increase in a temperature of the memory device; and
      modify one or more operations for accessing the memory device in accordance with the cause of the increase in the temperature of the memory device.

2. The memory system of claim 1, wherein the one or more controllers are further configured to cause the memory system to:
   receive signaling that indicates the plurality of temperature levels of the memory device at the plurality of time points, wherein the cause of the increase in the temperature of the memory device is determined in response to the plurality of temperature levels comprising at least one temperature level that satisfies a threshold.

3. The memory system of claim 1, wherein the one or more controllers are further configured to cause the memory system to:
   estimate, at a first time, a projected temperature level of the memory device at a second time that is after the first time, wherein the one or more controllers are configured to cause the memory system to modify the one or more operations for accessing the memory device in accordance with the projected temperature level.

4. The memory system of claim 3, wherein the one or more controllers are further configured to cause the memory system to:
   calculate a first derivative of the temperature of the memory device over a duration spanning at least two time points from among the plurality of time points, wherein the projected temperature level is determined in accordance with a current temperature level of the memory device and the first derivative.

5. The memory system of claim 3, wherein the one or more controllers are further configured to cause the memory system to:
calculate a second derivative of the temperature of the memory device over a duration spanning at least two time points from among the plurality of time points, wherein the projected temperature level is determined based at least in part on a current temperature level of the memory device and the second derivative.

6. The memory system of claim 1, wherein the one or more controllers are further configured to cause the memory system to:
calculate, in response to at least one temperature level from among the plurality of temperature levels satisfying a threshold, a first-order derivative of the temperature of the memory device over a duration spanning at least two time points from among the plurality of time points, wherein the cause of the increase in the temperature of the memory device is determined to be an increase in the ambient temperature in accordance with the first-order derivative satisfying a second threshold.

7. The memory system of claim 1, wherein the one or more controllers are further configured to cause the memory system to:
calculate, in response to at least one temperature level from among the plurality of temperature levels satisfying a threshold, a second-order derivative of the temperature of the memory device over a duration spanning at least two time points from among the plurality of time points, wherein the cause of the increase in the temperature of the memory device is determined to be an increase in the frequency of access operations in accordance with the second-order derivative satisfying a second threshold.

8. The memory system of claim 1, wherein the one or more controllers are further configured to cause the memory system to:
calculate, in response to at least one temperature level from among the plurality of temperature levels satisfying a threshold, a first-order derivative of the temperature of the memory device and a second-order derivative of the temperature of the memory device over a duration spanning at least two time points from among the plurality of time points, wherein the cause of the increase in the temperature of the memory device is determined in accordance with the plurality of temperature levels of the memory device, the first-order derivative, the second-order derivative, a frequency of previously received access commands, or any combination thereof.

9. The memory system of claim 1, wherein the one or more controllers are configured to cause the memory system to:
modify the one or more operations for accessing the memory device in a linear manner in accordance with the increase in the temperature of the memory device being caused by an increase in the ambient temperature.

10. The memory system of claim 1, wherein the one or more controllers are configured to cause the memory system to:
modify the one or more operations for accessing the memory device in an exponential manner in accordance with the increase in the temperature of the memory device being caused by an increase in the frequency of access operations at the memory device.

11. A non-transitory, computer-readable medium storing code comprising instructions which, when executed by one or more processors of a memory system, cause the memory system to:
determine, in accordance with a plurality of temperature levels of a memory device at a plurality of time points, which one of a change in an ambient temperature and a change in a frequency of access operations at the memory device is a cause of an increase in a temperature of the memory device; and
modify one or more operations for accessing the memory device in accordance with the cause of the increase in the temperature of the memory device.

12. The non-transitory, computer-readable medium of claim 11, wherein the instructions, when executed by the one or more processors, further cause the memory system to:
receive signaling that indicates the plurality of temperature levels of the memory device at the plurality of time points, wherein the cause of the increase in the temperature of the memory device is determined in response to the plurality of temperature levels comprising at least one temperature level that satisfies a threshold.

13. The non-transitory, computer-readable medium of claim 11, wherein the instructions, when executed by the one or more processors, further cause the memory system to:
estimate, at a first time, a projected temperature level of the memory device at a second time that is after the first time, wherein the instructions, when executed by the one or more processors, further cause the memory system to modify the one or more operations for accessing the memory device in accordance with the projected temperature level.

14. The non-transitory, computer-readable medium of claim 13, wherein the instructions, when executed by the one or more processors, further cause the memory system to:
calculate a first derivative of the temperature of the memory device over a duration spanning at least two time points from among the plurality of time points, wherein the projected temperature level is determined in accordance with a current temperature level of the memory device and the first derivative.

15. The non-transitory, computer-readable medium of claim 13, wherein the instructions, when executed by the one or more processors, further cause the memory system to:
calculate a second derivative of the temperature of the memory device over a duration spanning at least two time points from among the plurality of time points, wherein the projected temperature level is determined in accordance with a current temperature level of the memory device and the second derivative.

16. The non-transitory, computer-readable medium of claim 11, wherein the instructions, when executed by the one or more processors, further cause the memory system to:
calculate, in response to at least one temperature level from among the plurality of temperature levels satisfying a threshold, a first-order derivative of the temperature of the memory device over a duration spanning at least two time points from among the plurality of time points, wherein the cause of the increase in the temperature of the memory device is determined to be an increase in the ambient temperature in accordance with the first-order derivative satisfying a second threshold.

17. The non-transitory, computer-readable medium of claim 11, wherein the instructions, when executed by the one or more processors, further cause the memory system to:

calculate, in response to at least one temperature level from among the plurality of temperature levels satisfying a threshold, a second-order derivative of the temperature of the memory device over a duration spanning at least two time points from among the plurality of time points, wherein the cause of the increase in the temperature of the memory device is determined to be an increase in the frequency of access operations in accordance with the second-order derivative satisfying a second threshold.

18. The non-transitory, computer-readable medium of claim 11, wherein the instructions, when executed by the one or more processors, further cause the memory system to:

calculate, in response to at least one temperature level from among the plurality of temperature levels satisfying a threshold, a first-order derivative of the temperature of the memory device and a second-order derivative of the temperature of the memory device over a duration spanning at least two time points from among the plurality of time points, wherein the cause of the increase in the temperature of the memory device is determined in accordance with the plurality of temperature levels of the memory device, the first-order derivative, the second-order derivative, a frequency of previously received access commands, or any combination thereof.

19. A method by a memory system, comprising:

determining, in accordance with a plurality of temperature levels of a memory device at a plurality of time points, which one of a change in an ambient temperature and a change in a frequency of access operations at the memory device is a cause of an increase in a temperature of the memory device; and modifying one or more operations for accessing the memory device in accordance with the cause of the increase in the temperature of the memory device.

20. The method of claim 19, further comprising:

estimating, at a first time, a projected temperature level of the memory device at a second time that is after the first time, wherein modifying the one or more operations for accessing the memory device is in accordance with the projected temperature level.

\* \* \* \* \*